Figure 1:
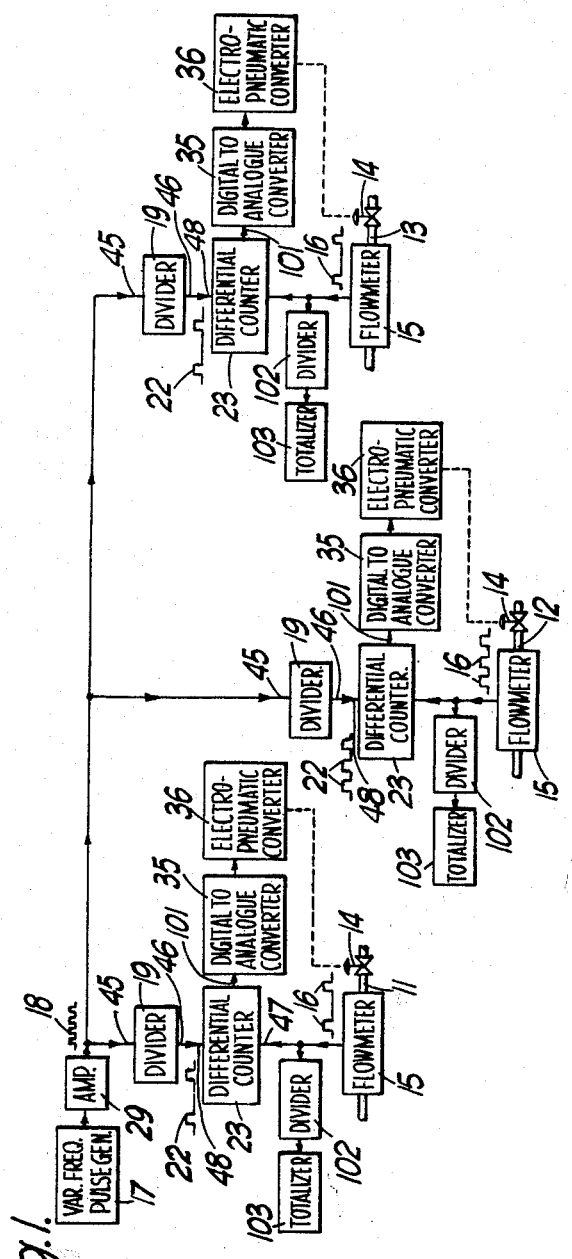

INVENTORS
HOWARD HARRY ROSENBROCK
JOOST JACOB JISKOOT
BY
Bacon & Thomas
ATTORNEYS

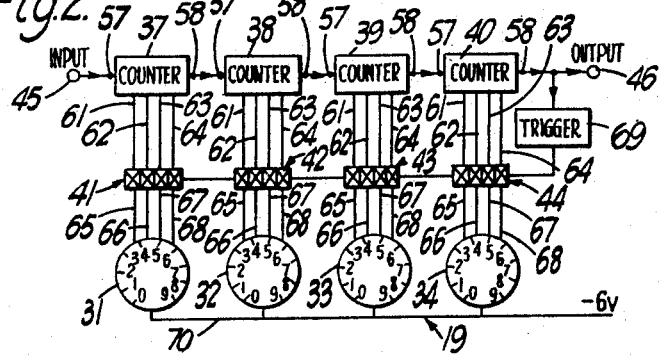
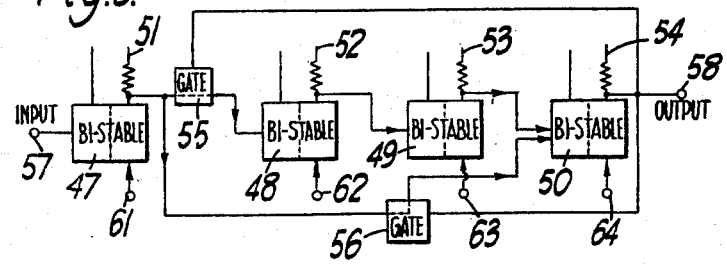
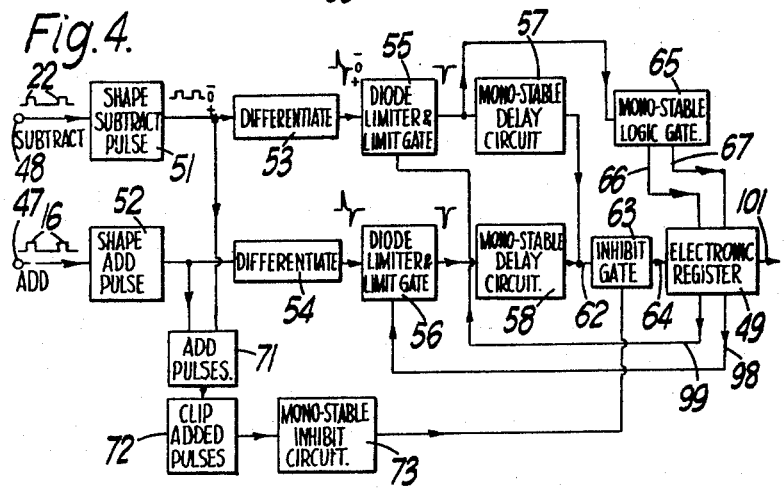
INVENTORS
HOWARD HARRY ROSENBROCK
JOOST JACOB JISKOOT
BY
Bacon & Thomas
ATTORNEYS

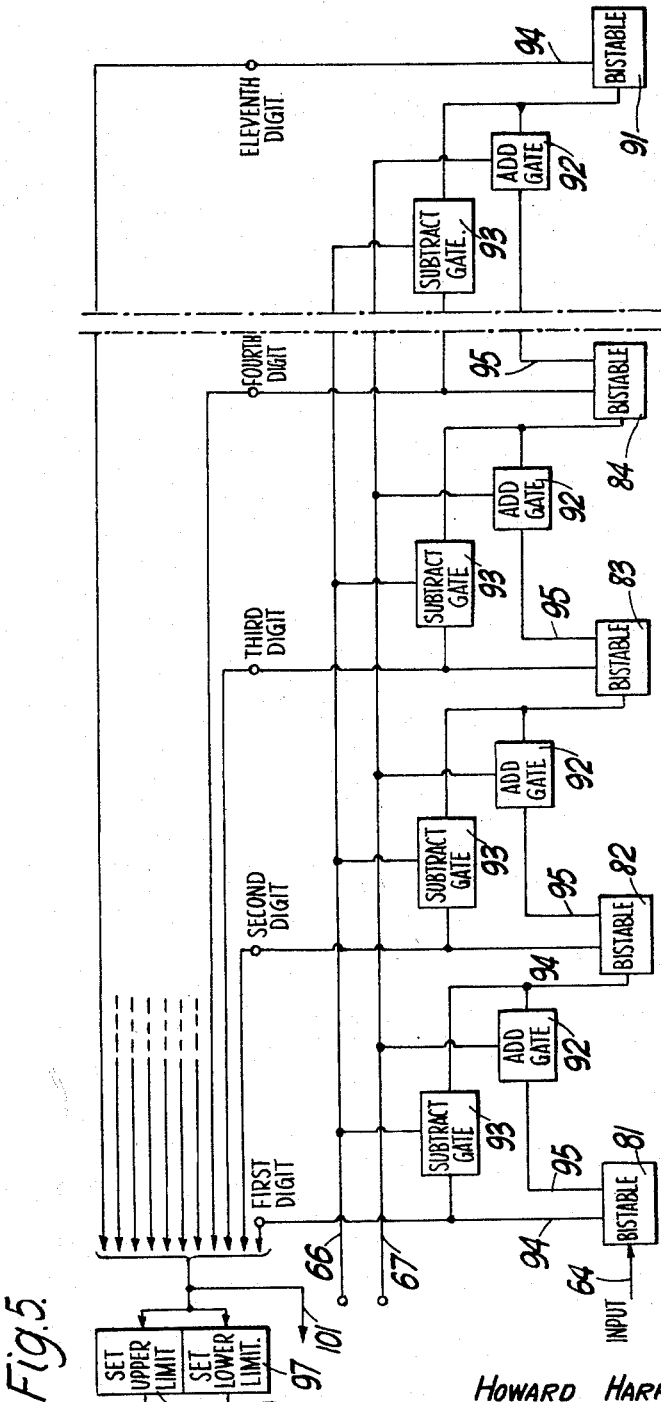

United States Patent Office 3,174,504
Patented Mar. 23, 1965

3,174,504
APPARATUS FOR CONTROLLING FLOW OF MATERIAL
Howard Harry Rosenbrock and Joost Jacob Jiskoot, London, England, assignors to Constructors John Brown Limited, London, England, a company of Great Britain
Filed Sept. 14, 1959, Ser. No. 839,907
Claims priority, application Great Britain, Sept. 16, 1958, 29,652/58
22 Claims. (Cl. 137—486)

The invention relates to apparatus for controlling flow of material.

The invention provides apparatus for controlling the rate of flow of at least one stream of mtaerial, which apparatus comprises, in combination, a pulse generator for producing a succession of pulses (hereinafter referred to as reference pulses), means for producing a succession of pulses (hereinafter referred to as flow pulses) at a rate proportional to the rate of flow of the stream, means for detecting any departure from a predetermined relationship between the rates of production of the reference pulses and of the flow pulses, and means controlled by the detecting means for changing the rate of flow of the stream in a direction to tend to restore the said predetermined relationship.

Preferably the apparatus includes a pulse generator for producing a succession of pulses (hereinafter referred to as derived pulses) at a rate which is proportional to the rate of production of the reference pulses, the said detecting means are arranged to detect any difference between the rates of production of the derived pulses and the flow pulses, and the means for changing the rate of flow of the stream are controlled by the detecting means to tend to reduce that difference to zero.

Preferably there are a plurality of sets of derived pulse generators, flow pulse generators, detecting means and rate of flow changing means, associated respectively with a plurality of streams of material, so that the relative rates of flow of the streams may be controlled.

Preferably each derived pulse generator comprises a counter for producing a succession of derived pulses at a rate which is a sub-multiple of the rate of production of the reference pulses. The pulses are preferably electrical pulses.

A specific construction of apparatus embodying the invention will now be described by way of example and with reference to the accompanying drawings, in which:

FIGURE 1 is a diagram of the complete apparatus,
FIGURE 2 is a diagram of one of the divider circuits,
FIGURE 3 is a diagram of one of the scale-of-ten counters employed in the divider circuits,
FIGURE 4 is a diagram of one of the detector or differential counter circuits, and
FIGURE 5 is a diagram of the electronic register employed in the differential counter circuits.

In this example the apparatus is employed for continuously blending three streams of different liquids e.g. oils, in accurately metered proportions.

The streams of liquid flow respectively through pipes 11, 12, 13 which are controlled respectively by pneumatically operated valves 14. Positive displacement flow meters 15 measure the rates of flow through the respective pipes, and each meter 15 provides a succession of electric pulses 16 (flow pulses) at a rate proportional to the rate of flow of the particular stream.

An electronic pulse generator 17 provides a succession of electric pulses 18 (reference pulses) at a steady rate. That rate may be altered by adjustment of the generator 17. The reference pulses 18 are fed to each of three electronic divider circuits 19. Each divider circuit 19 comprises an electronic counter which counts the reference pulses and produces one pulse (derived pulse) each time a preselected number of reference pulses has been received by the divider circuit. Each divider circuit 19 is provided with ratio selector switches 31, 32, 33, 34 for selecting the ratio between the rates of production of the derived pulses and the reference pulses. The selector switches 31–34 may be set so that the associated divider circuit produces one derived pulse for each reference pulse or one derived pulse for each 9,999 reference pulses or so that the ratio has some other value between those numbers.

The succession of derived pulses 22 are fed to differential counter circuits 23. The flow pulses 16 from the associated flow meter 15 are also fed to each differential counter circuit 23, and each circuit 23 provides an output dependent upon any difference between the number of the derived pulses 22 and the number of the flow pulses 16 which have been fed to it, and consequently that output is dependent upon the difference between the average rates of the succession of derived pulses 22 and the succession of flow pulses 16. The output from each differential counter circuit 23 controls the associated valve 14 through a digital-to-analogue converter 35 and an electro-pneumatic converter 36, so as to change the rate of flow of the stream through the associated pipe 11, 12 or 13 until the rate of production of the flow pulses 16 is equal to the rate of production of the derived pulses 22. The rate of flow of each of the streams of liquid in the pipes 11, 12, 13 is thus controlled in accordance with the rate of production of the associated succession of derived pulses 22, and this in turn is determined by the rate of production of the reference pulses 18 and the ratio to which the associated divider circuit 19 is set. Thus, the relative rates of flow of the streams of liquid in the pipes 11, 12, 13 may be changed by changing the ratio to which the various divider circuits 19 are set. Further, the rates of flow of all the streams may be increased or decreased together, while maintaining their relative rates of flow, by altering the set rate of the reference pulses by adjustment of the generator 17.

The pulse generator 17 is of well known construction and comprises a free-running multivibrator circuit, the frequency of which is determined by the time constant of two pairs of components, each pair comprising a resistor and capacitor, in the circuit. The frequency may be adjusted by altering the value of either the resistor or the capacitor, simultaneously in each pair, and in this particular construction the values of the resistors are variable in order to adjust the frequency. In this example, the frequency of the pulse generator 17 is variable between 10,000 pulses per second and 100,000 pulses per second. The multivibrator circuit employs transistors and its output is in the form of square negative-going pulses having an amplitude of about −6 volts. The output of the pulse generator 17 is fed to the divider circuits 19 through a conventional buffer amplifier 29.

Each of the divider circuits 19 is as shown in FIGURE 2. It comprises four electronic "scale-of-ten" counter circuits 37, 38, 39, 40, four groups of reset gates 41, 42, 43, 44 and selector switches 31, 32, 33 and 34. The four scale-of-ten counters 37–40 are arranged in series so that they form a four decade counter. Each of the scale-of-ten counters can be set by its associated group of reset gates to start counting from any desired digit from 0 to 9, so that the four decade counter 37, 38, 39, 40 can be set to start counting from any number between 0 and 9,999. The reference pulses 18 are applied to the input terminal 45 and if the four decade counter is set to start counting from zero an output pulse is delivered from the output terminal 46 for every 10,000 reference pulses applied to the input terminal 45. If the four decade counter is set to start counting from 9,999 then a pulse appears at the output terminal 46 for every reference pulse 18 applied to the input terminal 45.

Each of the scale-of-ten counter circuits 37–40 is as shown in FIGURE 3. It comprises four conventional bi-stable circuits 47, 48, 49, 50 employing transistors. As is well known in the electronic art, a bi-stable circuit has two main components (in the present case transistors) and has two alternative states, in one of which states one of the transistors is conducting and the other is non-conducting, and in the other of which states the second transistor is conducting and the first is non-conducting. The bi-stable circuit is changed from one state to the other by a pulse applied to its input and will remain in the state to which it is set until such time as another pulse is applied to the input. Each bi-stable circuit has a significant collector circuit 51, 52, 53, 54 and the particular state of the bi-stable circuit at any instant is indicated by whether or not the significant collector circuit of the bi-stable circuit is conducting or non-conducting. Each bi-stable circuit is employed, in the usual manner, to indicate a value of 0 or 1 for a binary digit.

When the counter circuit shown in FIGURE 3 is set to zero the significant collector circuits are all in conducting condition and the gate 55 is open so that pulses appearing in the significant collector circuit 51 of the bi-stable circuit 47 can pass to the bi-stable circuit 48, and the gate 56 is closed so that pulses are unable to pass from the bi-stable circuit 47 to the bi-stable circuit 50. When pulses are applied to the input terminal 57 the first three bi-stable circuits 47, 48, 49 count the first seven pulses in binary fashion. The eighth pulse causes the significant collector 54 of the bi-stable circuit 50 to be switched to the non-conducting condition, thereby causing the gate 55 to close and the gate 56 to open. The ninth pulse changes the state of the bi-stable circuit 47 and the tenth pulse resets the bi-stable circuit 47 to zero. The resulting output pulse from the bi-stable circuit 47 passes through the gate 56 and sets the bi-stable circuit 50 to zero. The resulting output pulse from the bi-stable circuit 50 opens the gate 55 and closes the gate 56. Thus, an output pulse is provided at the output terminal 58 for every ten pulses applied to the input terminal 57 when the scale-of-ten circuit starts each count from zero. The scale-of-ten circuit can be set to start each count from any decimal digit from 0 to 9 by resetting it to the binary number corresponding to that decimal digit immediately after each pulse from the output terminal. Each of the bi-stable circuits 47–50 is provided with a reset terminal 61, 62, 63, 64 for that purpose. One or more of the reset terminals 61–64 can be energised through the groups of reset gates 41–44 by means of the selector switches 31–34 in order to reset the scale-of-ten counting circuits to the desired number. Each of the selector switches 31–34 is an ordinary wafer switch having four wafers each with ten positions numbered 0 to 9 as shown in FIGURE 2. For each position of the switch one or more of the four output terminals 65, 66, 67, 68 are connected to a supply line 69 (according to a code well known in the art) so that the appropriate combination of the output terminals 65–68 is energised to represent in binary form a digit to which the switch is set. Each time an output pulse appears at the terminal 46 of the dividing circuit 19 it is fed to a conventional trigger circuit 69 which opens all of the reset gates 41–44 for a short period thus connecting the combination of energised terminals 65–68 of the switches 31–34 to the reset terminals 61–64 of the scale-of-ten counters 37–40 to reset those counters to the respective digits to which the switches 31–34 are set. The trigger circuit 69 closes the gates 31–34 after a short interval and the four decade counter 37–40 then begins counting the reference pulses again, starting at the number to which it has been reset.

The trigger circuit 69 is a conventional mono-stable circuit which normally remains in one stable condition but which is temporarily switched to another condition each time an input pulse is applied to it, reverting to its normal stable condition automatically a short time after each input pulse. The reset gates 41–44 are diode gates of conventional design.

If for example the selector switches 31–34 are set to the number 1672, then a pulse will appear at the output terminal 46 for every 8328 reference pulses applied to the input terminal 45, as the four decade counter 37–40 will reach 9,999 and produce an output pulse when the 8328th reference pulse has been applied to it after it has been reset to 1672. In this example the scales of the selector switches 31, 34 are marked with the complement with respect to 10,000 of the number to which they reset, the four decade counter 37–40 thereby indicating directly the ratio between the rates of production of the derived pulses and the reference pulses.

Each of the differential counting circuits 23 is as shown in FIGURE 4. The derived pulses 22 from the output of the associated divider circuit 19 are applied to an input terminal 48, and the flow pulses 16 from the flow meter are applied to an input terminal 47. Each differential counting circuit includes an electronic register 49 which adds the number of flow pulses received from the flow meter and subtracts from the total number of flow pulses the number of derived pulses 22 received from the divider circuit 19. Two pulse-shaping circuits 51, 52 are provided and they are each in the form of a conventional mono-stable circuit which produces a pulse of uniform shape and duration each time a pulse is applied to its input. The shaped pulses are differentiated by conventional differentiating circuits 53, 54 which generate two sharp pulses of opposite polarity for each shaped square pulse. The pairs of sharp pulses are applied to conventional diode limiter and gate circuits 55, 56 which remove the sharp negative pulses and permit only the positive pulses to proceed. The positive pulses are applied to conventional mono-stable delay circuits 57, 58. Each mono-stable delay circuit provides an output pulse whenever a pulse from the preceding diode limiter and gate circuit is applied to it, the output pulse being produced with a short delay after the input pulse is applied to the delay circuit. The output terminals 61, 62 of the delay circuits 57, 58 are both connected through a conventional gate circuit 63 to the input terminal 64 of the electronic register 49. The output of the diode limiter and gate 55 is connected to the input of a conventional mono-stable gate circuit 65 which has two connections 66, 67, to the electronic register 49. The gate circuit 65 normally energises the terminal 67 of the register 49 and so puts the register 49 in the condition in which it adds pulses, which are applied to its input 64, to the total indicated by the register. When a derived pulse 22 is applied to the input 48 of the differential counter circuit, a pulse is accordingly applied to the input of the gate 65 which changes its state temporarily and for a short period energises the terminal 66 and de-energises the terminal 67. This causes the register 49 to be changed to a condition in which it subtracts from its total the pulse which appears at its input 64 during that short period. Thus, the flow pulses 16 are added by the register 49 and the number of derived pulses 22 is subtracted from their total by the register.

In the event of a flow pulse and a derived pulse arriving at the differential counter in overlapping time relationship, both of them are prevented from reaching the register 49 by means of a circuit 71, 72, 73 which closes the gate 63 for a short period in those circumstances. The outputs from the pulse-shaping circuits 51 and 52 are added by a conventional adding circuit 71 and their total is passed to a conventional pulse-clipping circuit 72 which provides an output if the signal passed to it from the adding circuit 71 significantly exceeds in amplitude that of a single pulse. In those circumstances the output from the pulse clipping circuit 72 triggers a conventional mono-stable circuit 73 which provides an output to the gate 63 for a short time, thereby closing that gate for a time period which exceeds the delay periods of the delay circuits 57 and 58. The gate 63 then opens to permit addition and subtraction of subsequent non-overlapping pulses.

The electronic register 49 is as shown in FIGURE 5. It comprises eleven conventional bi-stable circuits of which only the first four, 81, 82, 83, 84 and the last one 91 are shown, for convenience of drawing. The circuit arrangements of the remainder of the eleven bi-stable circuits are identical with those illustrated. The states of the eleven bi-stable circuits 81–91 represent respectively the eleven digits of the eleven digit binary number stored in the register. Each of the bi-stable circuits, with the exception of the bi-stable circuit 81 is connected to the bi-stable circuit of the preceding digit through either an add gate 92 or a subtract gate 93. When the input terminal 66 is energised all of the subtract gates 93 are open, to transmit pulses between the adjacent bi-stable circuits, and the add gates 92 are all closed so as to prevent pulses from passing through them between the adjacent bi-stable circuits. When the input terminal 67 is energised the add gates 92 are open and the subtract gates 93 are closed. When the terminal 67 is energised and input pulses are applied to the input terminal 64 the pulses are added to the total stored in the register in the ordinary way. The subtract gates 93 and the add gates 92 are connected respectively to the two collector circuits 94, 95 of the respective bi-stable circuits, and consequently when the terminal 66 is energised the input pulses applied to the input terminal 64 are subtracted from the number stored in the register instead of being added to it. The significant collectors 94 of the bi-stable circuits 81–91 are connected to each of two conventional diode matrix limit circuits 96, 97. The limit circuit 97 provides a signal at its output terminal 99 when the number stored in the register falls to 32. The limit circuit 96 produces a signal at its output terminal 98 when the number stored in the register rises to 2016. The register is initially set to store the number 1024 and that number corresponds to the condition when the flow in the associated pipe is at the desired rate as determined by the settings of the pulse generator 17 and the appropriate divider circuit 19. A signal is thus provided at the output terminal 98 when the number stored in the register rises by 992 to 2016 and the signal is provided at the output terminal 99 when the number stored in the register falls by 992 to 32. The signal from the terminal 98 is applied to the gate 56 so that that gate closes and prevents any further pulses from increasing the number stored in the register when it has reached the above-mentioned top limit. The signal from the terminal 99 is applied to the gate 55 thereby to close that gate to prevent further pulses from being subtracted from the number stored in the register when that number has reached the above-mentioned lower limit.

The significant collectors of the bi-stable circuits 81–91 provide an output 101 which is connected to the conventional digital-to-analogue converter 35. This comprises eleven bi-stable circuits each controlling a diode gate and fed respectively from the eleven significant collector circuits of the bi-stable circuits 81–91 of the differential counting circuit. The diode gates of the digital-to-analogue converter are arranged to close respectively circuits fed from a supply of stabilised voltage through stable resistances in such a way that the value of the total current flowing from the stabilised supply through the closed diode gates is a measure of the number stored in the register 49, i.e. it is an analogue of the digital representation of the number stored in the register. The analogue current may be arranged to vary between 1 ma. and 5 ma. as the number varies between its minimum and maximum values. The digital-to-analogue converter 35 includes an amplifier of high output impedance which amplifies a voltage obtained by passing the total analogue current through a stabilised resistor. The output of the amplifier operates the conventional electro-pneumatic converter 36.

The flow meter 15 is a conventional positive displacement flow meter fitted with a commercially available form of pulse generator which emits pulses at a rate which is proportional to the rate of flow of the oil through the meter. In the pulse generator the output shaft of the flow meter is rotatably connected to a coaxial transparent circular disc on which are engraved a very large number of thin radial lines. Another, but stationary, disc of transparent material similarly engraved is rigidly fixed close to the rotatable disc in such a way that the direction of the engraved lines on the stationary disc is slightly skew with respect to those engraved on the rotatable disc. A beam of light is directed through the two discs and interference patterns are set up in the transmitted light by reason of the lines on the discs. The interference patterns modulate the output of a photosensitive transistor thereby providing the flow pulses. These pulses are, if necessary, passed through a conventional pulse shaper before they are fed into the differential counter circuit 23. A mechanical gear box of fixed and known ratio may be included between the flow meter shaft and the flow pulse generator device if necessary or desired.

It is sometimes desirable to know the quantity of liquid which has passed through the flow meter 15. This quantity is directly proportional to the number of pulses generated and the flow pulses are applied to the input of a divider circuit 102 which is of similar construction to the divider circuit 19 but may conveniently have only three decades instead of four. The output of the divider circuit 102 feeds a totaliser 103 which is in the form of a conventional electromagnetic counter. The divider circuit 102 enables the number of flow pulses to be divided by a suitable factor before they are applied to the totaliser 103 so that the totaliser may read directly in any desired units, e.g. imperial gallons, tenths of imperial gallons, U.S. gallons, or litres.

The main initial functions of the apparatus are performed or controlled electronically and the accuracy of operation is not substantially affected by wear or ageing.

The invention is not restricted to the details of the foregoing example. For instance, the invention may be applied to the blending or mixing of any other streams of material, and the material is not necessarily liquid. The various circuits may employ hard or vacuum tubes or cold cathode tubes, including for example cold cathode counter tubes, instead of transistors. The divider circuits 19 may comprise counting circuits using a cold cathode valve, the cold cathode valve having a separate lead brought out from each counting cathode, in order to enable the dividing ratio to be adjusted.

We claim:

1. Apparatus for controlling the rate of flow of at least one stream of material, which apparatus comprises, in combination, an electronic reference pulse generator for producing a continuous succession of electrical pulses at a substantially constant rate independent of any flow rate, a flow pulse generator for producing a continuous succession of electrical pulses at an instantaneous rate proportional to the rate of flow of said stream of material, electronic means for detecting any departure from a predetermined relationship between the rate of production of the reference pulses and of the flow pulses and for producing an electrical output indicative of the direction of departure from said relationship, and means controlled by the electrical output of said electronic detecting means for changing the rate of flow of the stream in a direction to tend to restore the predetermined relationship.

2. Apparatus as claimed in claim 1 wherein the flow pulse generator includes a positive displacement type flow meter having means for generating electrical flow pulses.

3. Apparatus as claimed in claim 1 including a pulse counter connected to receive pulses from one of said pulse generators and arranged to produce a succession of derived pulses at a selected rate which is a submultiple of the rate of production of pulses from said generator.

4. Apparatus as claimed in claim 3 wherein there are a plurality of flow pulse generators, pulse counters, detecting means and rate of flow changing means, associated respectively with a plurality of streams of material and with a single reference pulse generator, and wherein said single reference pulse generator provides a reference pulse signal for each of the plurality of detecting means and said counters are separately adjustable to produce derived pulses at selected rates so that the relative rates of flow of the streams may be controlled.

5. Apparatus as claimed in claim 1, including a pulse generator connected to said reference pulse generator for deriving a succession of electrical pulses from said reference pulses at a rate which is different from and proportional to the rate of production of the reference pulses, the said detecting means are arranged to detect any difference between the rates of production of the derived pulses and the flow pulses, and the means for changing the rate of flow of the stream are controlled by the detecting means to tend to reduce that difference to zero.

6. Apparatus as claimed in claim 5, in which there are a plurality of sets of derived pulse generators, flow pulse generators, detecting means and rate of flow changing means, associated respectively with a plurality of streams of material, the derived pulse generators each being fed by the reference pulse generator and each producing derived pulses at a rate which is proportional to the rate of production of the reference pulses, so that the relative rates of flow of the streams may be controlled.

7. Apparatus as claimed in claim 6, in which each derived pulse generator comprises a counter for producing a succession of derived pulses at a rate which is a sub-multiple of the rate of production of the reference pulses.

8. Apparatus as claimed in claim 7, in which each counter is adjustable to set the value of the said sub-multiple, whereby the ratio of the rates of flow of the streams is adjustable by adjustment of the counters.

9. Apparatus as claimed in claim 8, in which the reference pulse generator is adjustable to set the rate of production of the reference pulses, whereby the total rate of flow of the streams may be adjusted without altering the ratio of their individual rates of flow.

10. Apparatus as claimed in claim 9, in which each said detecting means comprises means for counting the total number of derived pulses from the derived pulse generator associated with one of the streams, means for counting the total number of flow pulses from the flow pulse generator associated with the said one of the streams, and means for determining the number and sign of the difference between the said totals.

11. Apparatus for controlling the rate of flow of at least one stream of material, which apparatus comprises, in combination, an electronic reference pulse generator for producing a continuous succession of electrical pulses at a substantially constant rate independent of any flow rate, a flow pulse generator for producing a continuous succession of electrical pulses at an instantaneous rate proportional to the rate of flow of said stream of material, electronic means for continuously counting the difference between the number of pulses which have been produced by the flow pulse generator and the number of pulses which have been produced by the reference pulse generator and for producing an electrical output which is a measure of the said difference, and means controlled by the said electrical output for changing the rate of flow of the stream in a direction to tend to reduce the said difference to zero.

12. Apparatus for controlling the rate of flow of at least one stream of material, which apparatus comprises in combination, an electronic reference pulse generator for producing a succession of electrical pulses at a substantially constant rate independent of any flow rate, a flow pulse generator for producing a succession of electrical pulses at an instantaneous rate proportional to the rate of flow of said stream of material, a pulse generator connected to said reference pulse generator for deriving a succession of electrical pulses from said reference pulses at a rate which is different from and proportional to the rate of production of the reference pulses, electronic detecting means for continuously counting the difference between the number of pulses which have been produced by the flow pulse generator and the number of pulses which have been derived from the said reference pulses and for producing an electrical output which is a measure of the said difference, and means controlled by the said electrical output for changing the rate of flow of the stream in a direction to tend to reduce the said difference to zero.

13. Apparatus as claimed in claim 12, in which there are a plurality of sets of derived pulse generators, flow pulse generators, electronic detecting means and rate of flow changing means, associated respectively with a plurality of streams of material, the derived pulse generators each being fed by the reference pulse generator and each producing derived pulses at a rate which is proportional to the rate of production of the reference pulses, so that the relative rates of flow of the streams may be controlled.

14. Apparatus as claimed in claim 13, in which each derived pulse generator comprises a counter for producing a succession of derived pulses at a rate which is a sub-multiple of the rate of production of the reference pulses.

15. Apparatus as claimed in claim 14, in which each counter is adjustable to set the value of the said sub-multiple whereby the ratio of the rates of flow of the streams is adjustable by adjustment of the counters.

16. Apparatus as claimed in claim 15, in which the reference pulse generator is adjustable to set the rate of production of the reference pulses, whereby the total rate of flow of the streams may be adjusted without altering the ratio of their individual rates of flow.

17. Apparatus for controlling the rate of flow of at least one stream of material, which apparatus comprises in combination, an electronic reference pulse generator for producing a succession of electrical pulses at a substantially constant rate independent of any flow rate, a flow pulse generator for producing a succession of electrical pulses at an instantaneous rate proportional to the rate of flow of said stream of material, a pulse counter connected to receive pulses from one of said pulse generators and arranged to produce a succession of derived pulses at a selected rate which is a submultiple of the rate of production of pulses from said generator, electronic means for continuously counting the difference between the number of pulses which have been produced by said pulse counter and the number of pulses which have been produced by the other of said pulse generators and for producing an electrical output which is a measure of the said difference, and means controlled by the said electrical output for changing the rate of flow of the stream in a direction to tend to reduce the said difference to zero.

18. Apparatus as claimed in claim 17 wherein there are a plurality of flow pulse generators, pulse counters, detecting means and rate of flow changing means, associated respectively with a plurality of streams of material and with a single reference pulse generator, and wherein at least one of siad counters is adjustable to produce derived pulses at a selected rate so that the relative rates of flow of the streams may be controlled.

19. Apparatus as claimed in claim 18 in which said counters are separately adjustable to produce derived pulses at selected rates.

20. Apparatus for controlling the rate of flow of at least one stream of material, which apparatus comprises, in combination, an electronic reference pulse generator for producing a continuous succession of electrical pulses at a substantially constant rate, a flow pulse generator for producing a continuous succession of electrical pulses at an instantaneous rate proportional to the rate of flow of said stream of material, electronic means for detecting any departure from a predetermined relationship between the rate of production of the reference pulses and of the flow pulses and for producing an electrical output indicative of the direction of departure from said relationship, and means controlled by the electrical output of said electronic detecting means for changing the rate of flow of the stream in a direction to tend to restore the predetermined relationship.

21. Apparatus as claimed in the claim 20 including a pulse counter connected to receive pulses from one of said pulse generators and arranged to produce a succession of derived pulses at a selected rate which is a submultiple of the rate of production of pulses from said generator.

22. Apparatus as claimed in the claim 21 wherein there are a plurality of flow pulse generators, pulse counters, detecting means and rate of flow changing means, associated respectively with a plurality of streams of material and with a single reference pulse generator, and wherein said single reference pulse generator provides a reference pulse signal for each of the plurality of detecting means and said counters are separately adjustable to produce derived pulses at selected rates so that the relative rates of flow of the streams may be controlled.

References Cited by the Examiner
UNITED STATES PATENTS

| | | | |
|---|---|---|---|
| 2,207,949 | 7/40 | Smith | 137—486 XR |
| 2,348,149 | 5/44 | Reinhardt et al. | 222—76 XR |
| 2,431,058 | 11/47 | Manning | 222—2 XR |
| 2,509,295 | 5/50 | Glass | 137—487.5 |

MARTIN P. SCHWADRON, *Acting Primary Examiner.*

ISADOR WEIL, *Examiner.*